Figure 6:
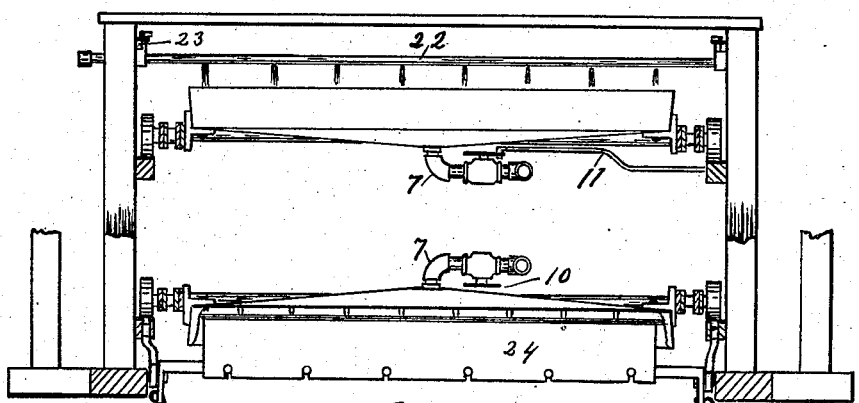

No. 885,004. PATENTED APR. 14, 1908.
E. P. LYNCH.
PROCESS FOR SEPARATING THE LIQUID FROM THE SOLID PORTIONS
OF TREATED ORES.
APPLICATION FILED OCT. 15, 1906.
3 SHEETS—SHEET 1.
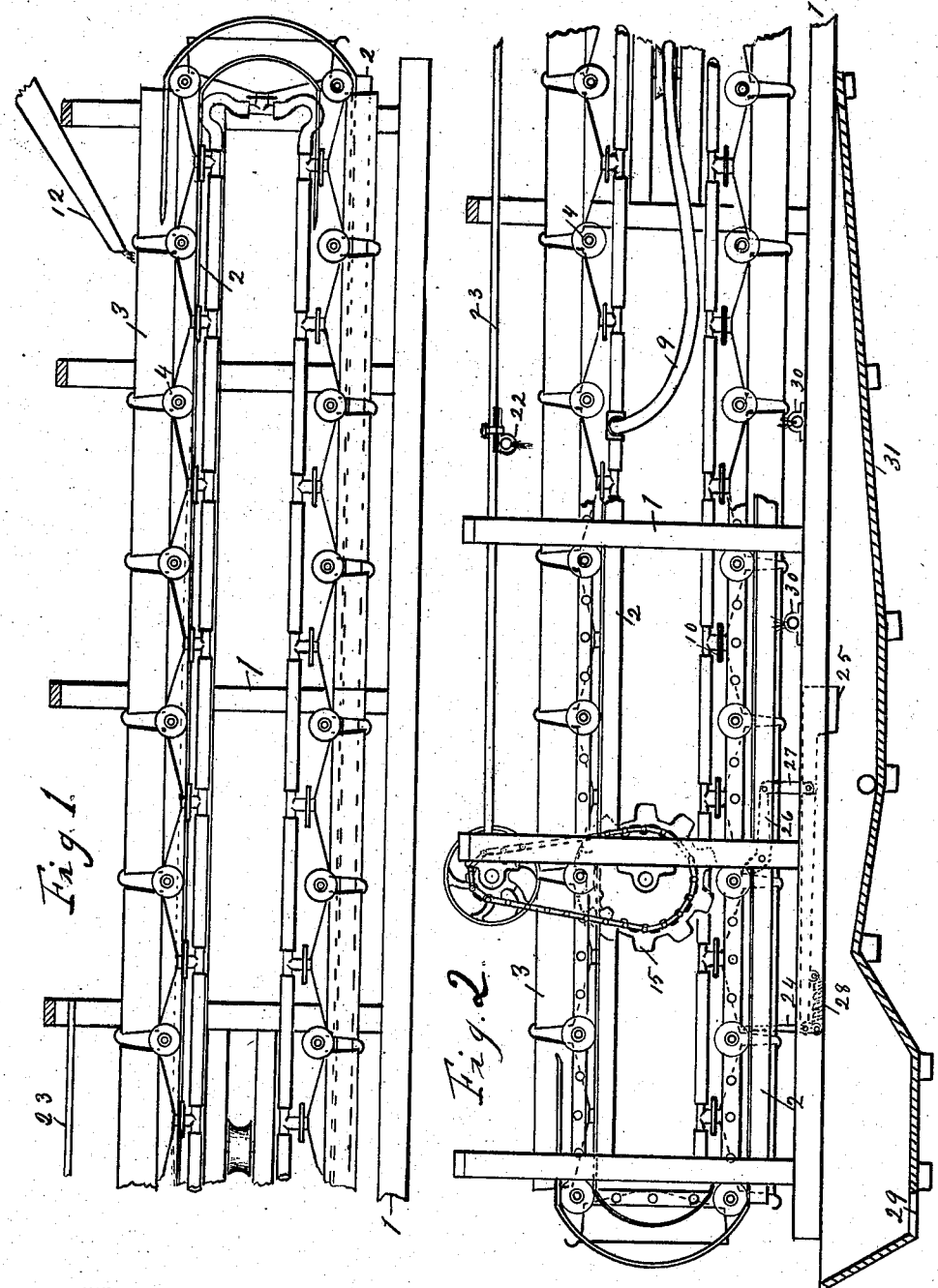
WITNESSES:
INVENTOR
Edward P. Lynch
BY
Spear & Seely
ATTORNEYS

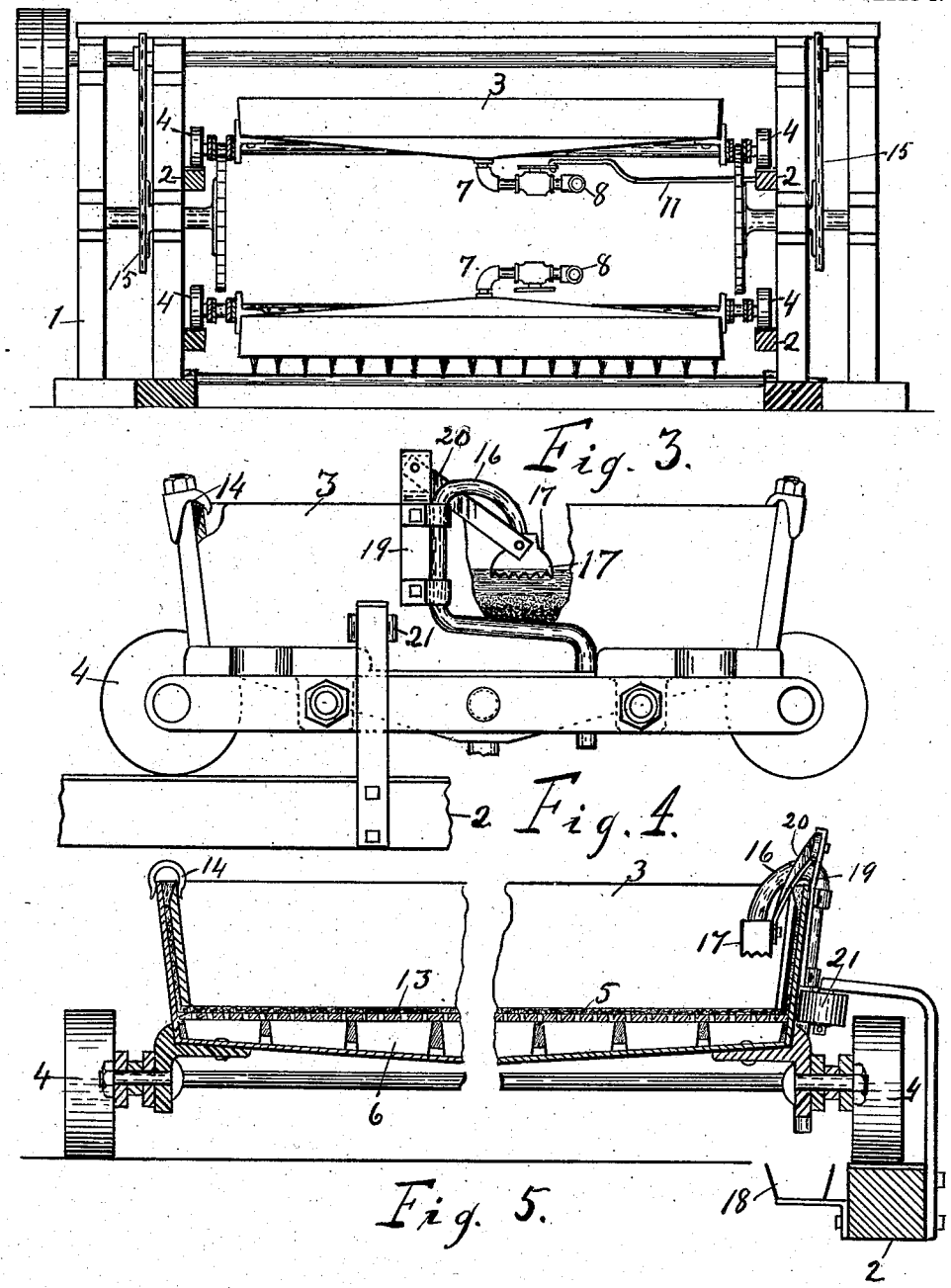

No. 885,004. PATENTED APR. 14, 1908.
E. P. LYNCH.
PROCESS FOR SEPARATING THE LIQUID FROM THE SOLID PORTIONS
OF TREATED ORES.
APPLICATION FILED OCT. 15, 1906.

3 SHEETS—SHEET 3.

WITNESSES:

INVENTOR
Edward P. Lynch
BY Spear & Seely
ATTORNEYS

UNITED STATES PATENT OFFICE.

EDWARD P. LYNCH, OF MILL VALLEY, CALIFORNIA.

PROCESS FOR SEPARATING THE LIQUID FROM THE SOLID PORTIONS OF TREATED ORES.

No. 885,004.     Specification of Letters Patent.     Patented April 14, 1908.

Original application filed October 23, 1905, Serial No. 284,076. Divided and this application filed October 15, 1906. Serial No. 339,102.

*To all whom it may concern:*

Be it known that I, EDWARD P. LYNCH, a citizen of the United States, and a resident of Mill Valley, in the county of Marin, State of California, have invented certain new and novel Improvements in the Process of Separating the Liquid from the Solid Portions of Treated Ores and other Substances, of which the following is a specification.

My invention relates to a method or process of separating from crushed ores or other products liquid or solvents that have been used upon them, as for extracting from the ores the values they contain and it is in a special way advantageous for separating cyanid solutions from ores upon which they have been acting.

The present application is a division of an application which was filed by me on October 23", 1905, having the Serial Number 284,076, in which the Patent Office held that two independent inventions were claimed, and that one or the other should be eliminated from said application. I decided to retain in said application an apparatus for the purpose mentioned and to file a separate application covering the inventive process, which is the present application.

In the matter of separating cyanid solutions from ores difficulties arise owing to the fact that the fine crushing which is necessary to enable the solution to readily reach the values puts much of the ore in such a condition that when the solution is added it forms slimes. The separation of the solution with the values from slimes is such a tedious and expensive process, as heretofore practiced, that many operators reconcile themselves to a large loss of the values contained in the ores, or to the expense of constructing large and costly plants in which the ores, which they grind coarse to avoid making the slimes, can be treated by percolation for many days at a time, owing to the inability of the solution to extract values from coarse ores quickly. The wastefulness of this method has prompted many efforts to be made to obtain better results by separating the coarser particles from the finer ones after the ore has been ground and then treating the two grades separately, the coarser particles by percolation and the finer particles or slimes by successive agitations, settlings and decantations, each time adding fresh solution. This is continued until the large percentage of the solution which must necessarily remain in the slimy tailings is of too small values to warrant further attention. By this method practically two plants must be equipped and taken care of and the consequent trouble and expense have been so great that means have been devised to try to overcome them. For instance, vessels have been arranged to receive a shallow layer of slimes which slimes are then acted upon by suction to remove the solution. Special vessels have also been constructed with bottom and cover with air tight joints that must be broken with each charge, in which a large body of material has been placed and subjected to suction and compression so as to remove the liquid from the top and bottom.

The first mentioned apparatus is objectionable owing to the fact that but a relatively small amount of material can be placed in each vessel, as the slimes quickly become so nearly impervious that it requires a long time for all of the liquid to be drawn off through them, while the latter mechanism is open to all the objections of treating large bodies of ores *en masse*, as the size of the plant and the length of time required and the loss of so much values in the solution that remains in the ore even after it has been subjected to the double process of suction and compression.

Still another objection to the suction process is the difficulty that is experienced in removing such a very thin layer of solid slimy material from the filtering cloth after the liquid portion has been withdrawn, as it will cling to the cloth with great tenacity.

Now in the process I have invented I have dispensed with the need of separating the crushed ores into coarser and finer grades and have no need of the expensive leaching plants, but after the ore has been acted upon by the solution, as by agitation, a common method, I pass a comparatively large quantity of it, that is of coarse and fine material mingled into trays whose construction as to filtering, vacuum and traveling features are preferably similar to those set forth in my application above referred to. This will cause the coarser portions of the ore to quickly settle to the bottom and forms a layer which will not only act as an additional filter for all the solution that will pass through it but will largely protect the filter cloth from being coated with slimes, so that when the trays are to be emptied the layer of waste or treated ores will the more readily break away from the filtering cloth without injuring it. As the suction acts almost instantly upon the coarser material and its action upon the slimes is in no way retarded thereby, it can safely be estimated that by this method a large quantity of the ore, possibly 50 or 60 per cent., is practically treated without cost, for the reason that the extraction of the liquid from the coarser particles does not require separate treatment and adds nothing to the time or expense that is required for the slimes.

There are many ores that produce from 50 to 60 per cent. of slimes, and it is necessary to add a large amount of liquid to them to properly extract their values, say two or three times the amount in weight to the weight of the ore being treated, it would take too long for such a volume of liquid to pass through the slimes, and especially after they had been compacted by the suction which begins to act upon them almost from the very instant they enter the trays. In such cases I supplement the vacuum or suction by other means which enable me, after the slimes have settled, and which can be expedited by the addition of lime to 5 or 10 minutes, to draw from the top surface a large portion of the solution, thus bringing the treatment of the most difficult ores to within a satisfactory length of time.

Briefly stated, the successive steps of my process of treating ores or other substances from which it is desired to remove fluids or solutions, are as follows, all or only a part of which may be taken, as circumstances require; first, subjecting the entire mass, as ore, coarse and fine, with its attendant solution, in comparatively shallow pans or trays, to the action of a vacuum; second, if the ores are of such a nature that much of it is slimes, to supplement the vacuum by a simultaneously drawing off from the top of the tray a large portion of the solution; third, then after all the solution has been removed that is possible, applying wash water to the mass of material in the tray in a sufficient quantity to enter the mass and replace the solution which it yet carries and, by aid of the vacuum, draw the water into the mass; fourth, then removing the waste, or the ore and water, as by reversing the trays, and fifth, cleansing the trays by mechanical means as with a scraper, and also liquid means, as by jets of water.

Figure 7:
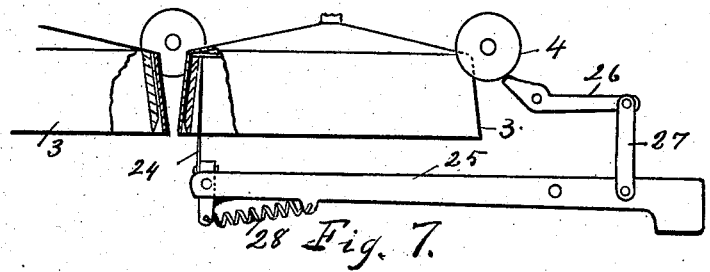
Figure 8:
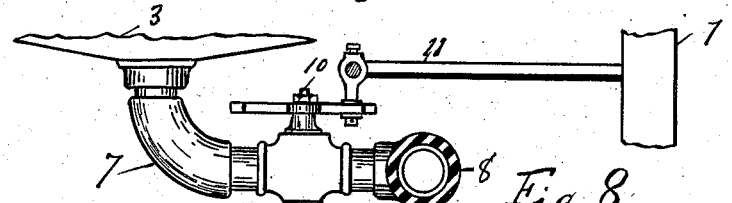
Figure 9:
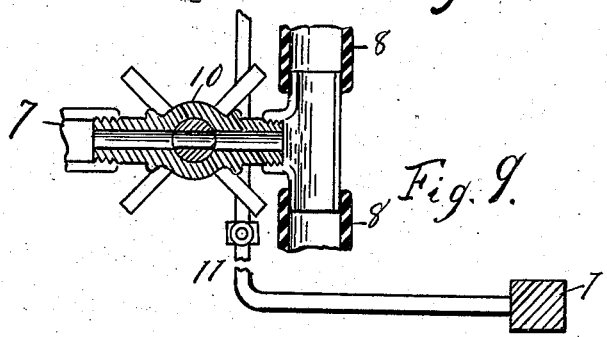

More particularly stated, my method or process may be carried out by any suitable means or mechanism, one of which is illustrated in the accompanying drawings, in which Figure 1 is a broken side elevation and should be read in connection with Fig. 2 as if the two were joined together as one figure. Fig. 2 is the complement of Fig. 1, as above stated. Fig. 3 is a transverse sectional view of the machine, taken at the point where the power is applied to operate the machine. Fig. 4 is an enlarged end view of one of the trays. Fig. 5 is a longitudinal central sectional view of the same. Fig. 6 is a broken elevation to show the operation of the scraper and also the application of wash water further back upon the machine. Fig. 7 is a broken view of the trays reversed, with the scraper in position in one of them. Fig. 8 is a detail view of one of the valves. Fig. 9 is a horizontal sectional view of the same.

Referring more particularly to the drawings which, however, are for illustrative purposes only and are not drawn to scale, 1 indicates a supporting frame upon which is mounted a track 2, preferably in two sections, one above the other and joined together at their ends by curved sections. Suitable trays 3 are arranged to travel upon the track, preferably in a connected series and upon wheels 4. These trays are comparatively shallow and each one is provided with a porous strainer or false bottom 5, which forms a suction chamber 6 between it and the real bottom. Connected with all of the suction chambers, as by valved pipes or nipples, 7 and rubber connectors 8, a suction pipe 9, which has its opposite end connected with any suitable means, not shown, for producing a vacuum and receiving the liquid contents of the trays.

The valves 10 in the pipes 7 are each adapted to be turned or actuated by stationary trips 11 so that communication with the chamber 6 will be established as soon as the tray receives its contents through the trough 12 from any suitable source of supply, not shown, and will be closed as soon as the wash water has been drawn into the mass for displacing the solution remaining therein. The false bottom 5, is preferably formed from suitable filtering cloth which is supported on a foraminous plate 13 so as to be held flat and smooth and thus permit of the ready cleansing of the tray after the solution has been removed. The edges of the cloth are preferably extended to the top of the tray and secured, as by means of clamps 14.

The trays are moved forward at any desired rate of speed by suitable gearing 15, which is driven from a source of power, not shown, and each tray is preferably provided with means for removing a portion of the solution from the top, as a pipe or compressible tube 16, which is provided at one end with a float 17 that is adapted to rest on top of the solution and the other end is adapted to discharge into a receptacle, as a trough 18. The tube 16 is supported by a standard 19, to the upper end of which an arm 20 is pivotally secured for holding the float 17. A portion of the tube is arranged horizontally upon the outside of the tray below the level of the liquid and in position to be engaged by a compressor, as a roller 21 that is adapted to compress or flatten the tube against the side of the tray as the tray moves forward, and thereby cause a siphonic action to be set up which will continue until the liquid contents of the tray above the layer of solid material has been drawn off. The roller is located at such a distance from the filling spout 12 that by the time the tray has reached it after having received its load or charge, the more solid portions will have settled and the liquid will be clear, which settling can be hastened by the addition of lime to the solution. Where the liquid is thus removed from the top it is done simultaneously with the removal from the bottom by suction. After as much of the solution as possible has been removed in this manner it is evident that a considerable portion will still remain in the ore which, with the values it contains, would be lost if it were not removed before the tray was emptied. To prevent this loss I provide means, as a pipe 22, through which a sufficient quantity of wash water may be discharged upon the layer of ore as to replace the solution which is forced or drawn out of the ore by the suction, the wash water taking its place as they pass downward. The pipe 22 is adjustably mounted on a support 23 so that it can be placed at such a distance from the trough 12, or siphon 16, when the latter is used, as to permit of all of the surplus liquid being removed before the wash water is applied. After the values have been thus removed the trays are emptied, which is preferably done by inverting them and removing the thin layer of solid matter which adheres with greater or less tenacity to the filtering cloth, the suction having been stopped by the valve 10 engaging with one of the trips 11. I prefer to use a scraper 24, which is preferably mounted on the free end of a weighted lever 25 and is normally held in engagement with the cloth but is removed therefrom and held out of the path of the edges of the trays by the free end of another lever 26 being engaged by one of the wheels 4 of the tray. The two levers are connected by a link 27 and the scraper is yieldingly held in its operative position by a spring 28. The waste thus removed from the trays preferably falls into a chute 29 and is thereby removed to any desired point, and if the trays are not thus sufficiently cleaned they are caused to pass over one or more pipes 30 by means of which jets of water can be forced up against the filtering cloth and thereby remove any material that may not have been removed by the scraper. The water thus thrown into the inverted trays falls into an extension 31 of the chute and passes off with the solid matter. After that the trays pass along upon the lower track to the charging end where they are righted by being moved to the upper track where they are again filled and their contents treated as before.

From the foregoing description it will be seen that by my process the extraction of the solution and its contained values is continuous and very rapid considering the large amount of material that can be treated in comparison with the ordinary leaching process. The suction quickly removes the liquid that can pass through the layer of ore on the cloth and the liquid which remains on top is removed therefrom as the trays move forward and while the suction is still active. The coarser particles naturally settle quicker than the finer portion, or slimes, and thereby forms a more porous portion which supports the latter and also aids in the removal of the contents at the close of the operation. The other steps follow in succession and the maximum amount of values are recovered in the shortest space of time.

The process is continuous and automatic for, after the charge of material and the supply of water have been adjusted to correspond with the travel of the trays, but little or no attention is required until there is a change in the quality of ore being treated. No extensive plant is required to accommodate a large number of leaching tanks which require much labor to fill and empty and days of time to extract the values. And where the material is received from an automatic and continuously operated agitator the process becomes one step in an ideal treatment of ores in which the ore is fed to the reducer or pulverizer at one point and, after having its values extracted, it is discharged as waste at another.

Having described my invention, I claim;

1. The herein described process of separating the liquid from the solid portions of treated ores and other substances, which consists in simultaneously subjecting a substantially thin body of the same, while in an extended form, to the action of suction from the bottom and decantation from the top.

2. The herein described process of separating the liquid from the solid portions of treated ores and other substances, which consists in automatically and simultaneously subjecting a forwardly moving stratum of the same to the action of suction from the bottom and decantation from the top.

3. The herein described process of separating the liquid from the solid portions of treated ores and other substances, which consists in removing the free liquid by suction and decantation and then removing the absorbed portion by introducing other liquid at the top of the mass of the solid portion and simultaneously therewith removing the absorbed portion by suction.

4. The herein described process of separating the liquid from the solid portions of treated ores and other substances, which consists in subjecting a forwardly moving, substantially thin stratum of the same to the action of suction from the bottom and successively removing the clarified top portion of the liquid by decantation and removing the absorbed portion by introducing wash water to the top of the solid mass while the action of suction still continues.

5. The herein described process of separating the liquid from the solid portions of treated ores and other substances, which consists in removing the same by suction, decantation and replacement, and then removing the waste in an automatic and continuous manner.

6. The herein described process of separating the liquid from the solid portions of treated ores and other substances, which consists in successively filling the trays of a forwardly moving series with the material to be treated, then removing the liquid portion by suction, decantation and replacement, and then inverting the trays and cleansing them by mechanical and also by liquid means.

7. The herein described process of separating the liquid from the solid portions of treated ores and other substances, which consists in successively and automatically forming substantially thin strata of the material to be treated and then removing the liquid by suction, decantation and replacement, and finally discharging the waste.

8. In the separation of the liquid from the solid portion of ore under treatment, the herein described method of causing a body of pulp composed of coarse ore and slimes to flow over a horizontally arranged filter in such manner that the coarse portion of the ore is evenly distributed upon the filter beneath the slimes, so as to form an additional filtering medium and to prevent the mass of the slimes from adhering to the filter, and subjecting the pulp to the action of a vacuum below the filter.

In testimony whereof I have hereunto affixed my signature on this 2nd day of October, 1906, in presence of two witnesses.

EDWARD P. LYNCH.

Witnesses:
  W. S. BOYD,
  F. M. BARTEL.